United States Patent [19]

Stewart et al.

[11] Patent Number: 4,520,616

[45] Date of Patent: Jun. 4, 1985

[54] METHOD AND SYSTEM FOR CONDITIONING AND REMOVING AQUATIC PLANTS

[75] Inventors: E. Allen Stewart, Cassadaga; Evan L. Keesling, Lake Helen, both of Fla.

[73] Assignee: Amasek, Inc., Cocoa, Fla.

[21] Appl. No.: 533,012

[22] Filed: Sep. 16, 1983

[51] Int. Cl.³ ............................................. A01D 44/00
[52] U.S. Cl. .................................................. 56/9; 56/8
[58] Field of Search ................... 56/8, 9; 440/100, 98

[56] References Cited

U.S. PATENT DOCUMENTS

| | | | |
|---|---|---|---|
| 172,113 | 1/1876 | Gordon | 440/100 |
| 319,352 | 6/1885 | Trahern | 56/9 |
| 733,360 | 7/1903 | Austin | 56/9 |
| 904,713 | 11/1908 | McDermott | 440/100 |
| 961,749 | 6/1910 | Bell | 440/100 |
| 981,183 | 1/1911 | Ferriss | 56/9 |
| 1,680,195 | 8/1928 | Allen | 440/100 |
| 1,795,003 | 3/1931 | Allen | 56/9 |
| 1,837,922 | 12/1931 | Preiss | 440/100 |
| 2,065,733 | 12/1936 | Pearson | 56/8 |
| 2,486,275 | 10/1949 | Grinwald | 56/8 |
| 2,524,938 | 10/1950 | Smith, Jr. | 440/100 |
| 2,896,391 | 7/1959 | Wade | 56/364 |
| 2,977,738 | 4/1961 | Hoover | 56/8 |
| 3,238,708 | 3/1966 | Zickefoose | 56/9 |
| 3,298,348 | 1/1967 | Sanders | 440/100 |
| 3,468,106 | 9/1969 | Myers et al. | 56/9 |
| 3,477,213 | 11/1969 | Just et al. | 56/9 |
| 3,530,651 | 9/1970 | Rounsville | 56/9 |
| 3,540,194 | 11/1970 | Chaplin | 56/9 |
| 3,611,680 | 10/1971 | Hendrickson | 56/9 |
| 4,258,534 | 3/1981 | Bryant | 56/9 |
| 4,328,658 | 5/1982 | Desrosiers et al. | 56/8 |
| 4,416,206 | 11/1983 | Hawk | 56/9 |

*Primary Examiner*—Paul J. Hirsch
*Attorney, Agent, or Firm*—Duckworth, Allen, Dyer & Pettis

[57] ABSTRACT

A system for conditioning and removing aquatic plants growing on the surface of a body of water includes a water craft having at least one rotatable drum, the specific density of which is less than one. Conditioning ribs extend away from the outer peripheral surface of the drum and a prime mover is provided for moving the craft across an area of compacted aquatic plants. The drum is rotated to permit the ribs to separate and condition the plants for a relatively uniform distribution across the surface of the water. The craft has means, such as a rope, cable or pushing fork for drawing the aquatic plants into a conveyor for removal. The water craft is provided with a steering mechanism of rugged construction permitting relatively facile movement.

23 Claims, 10 Drawing Figures

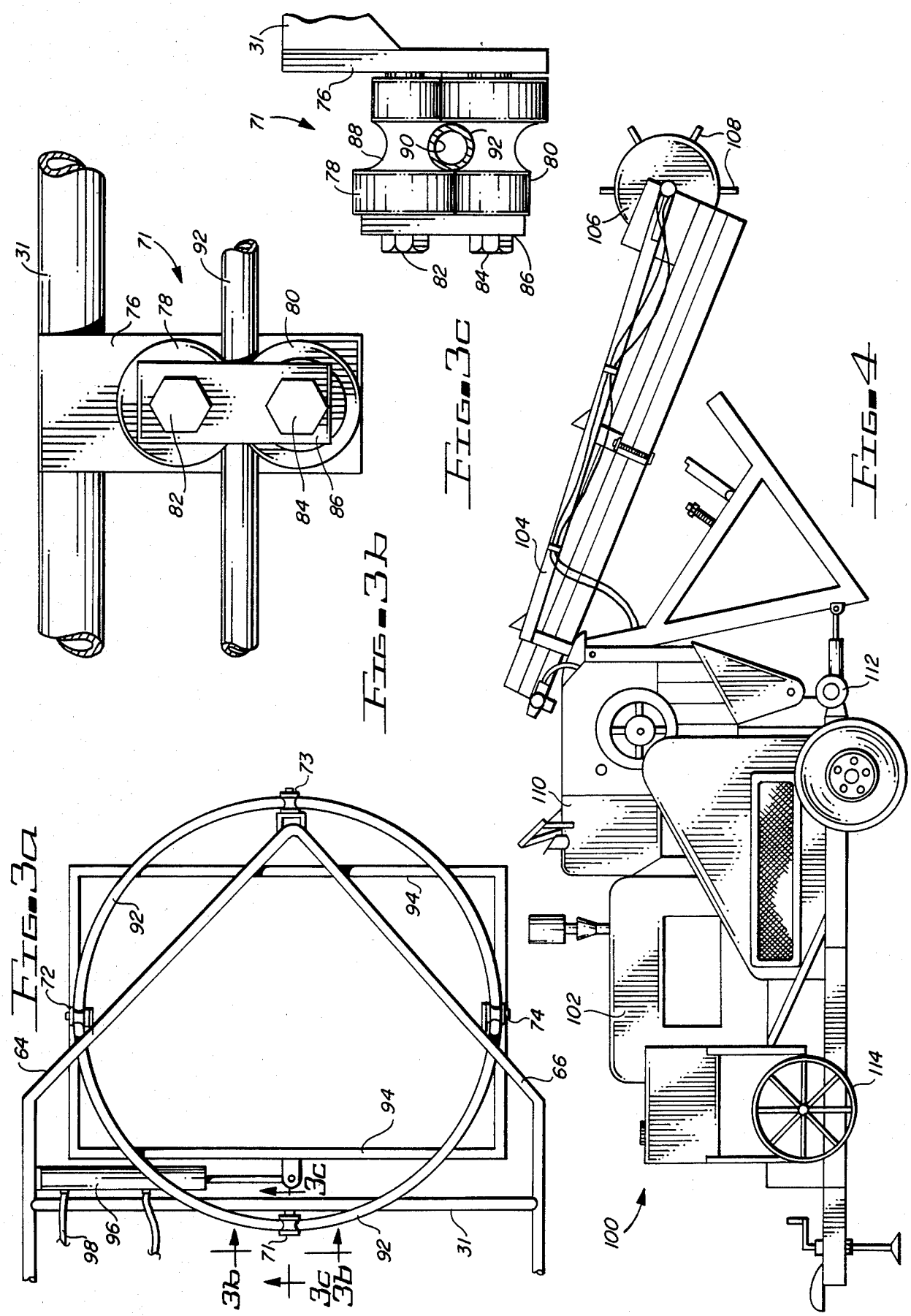

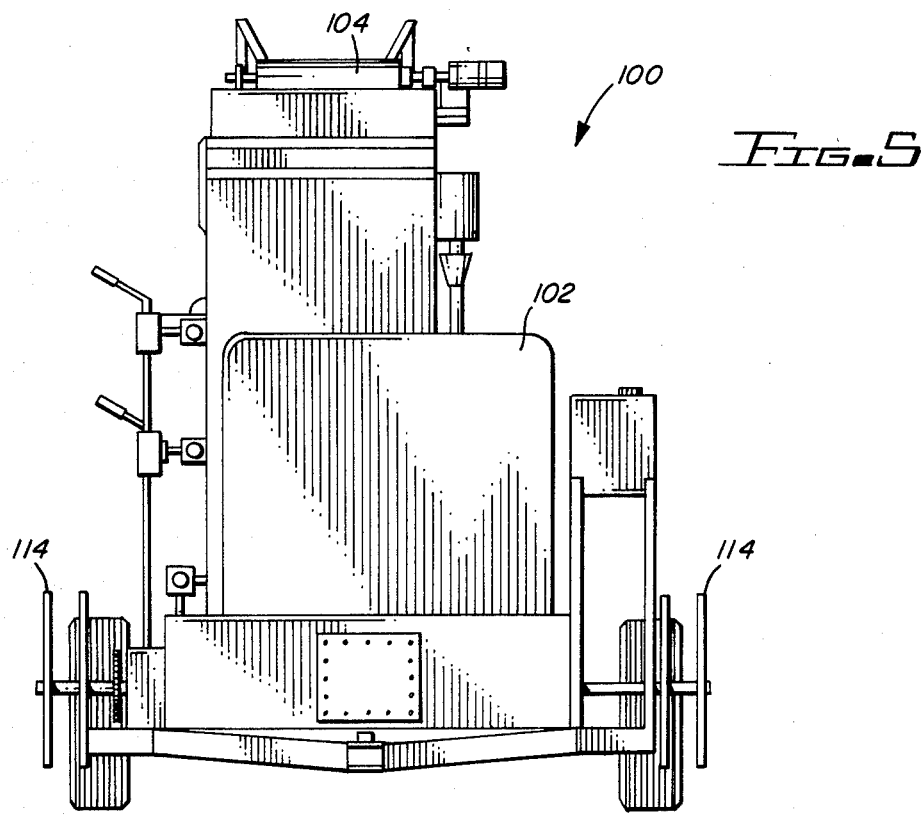
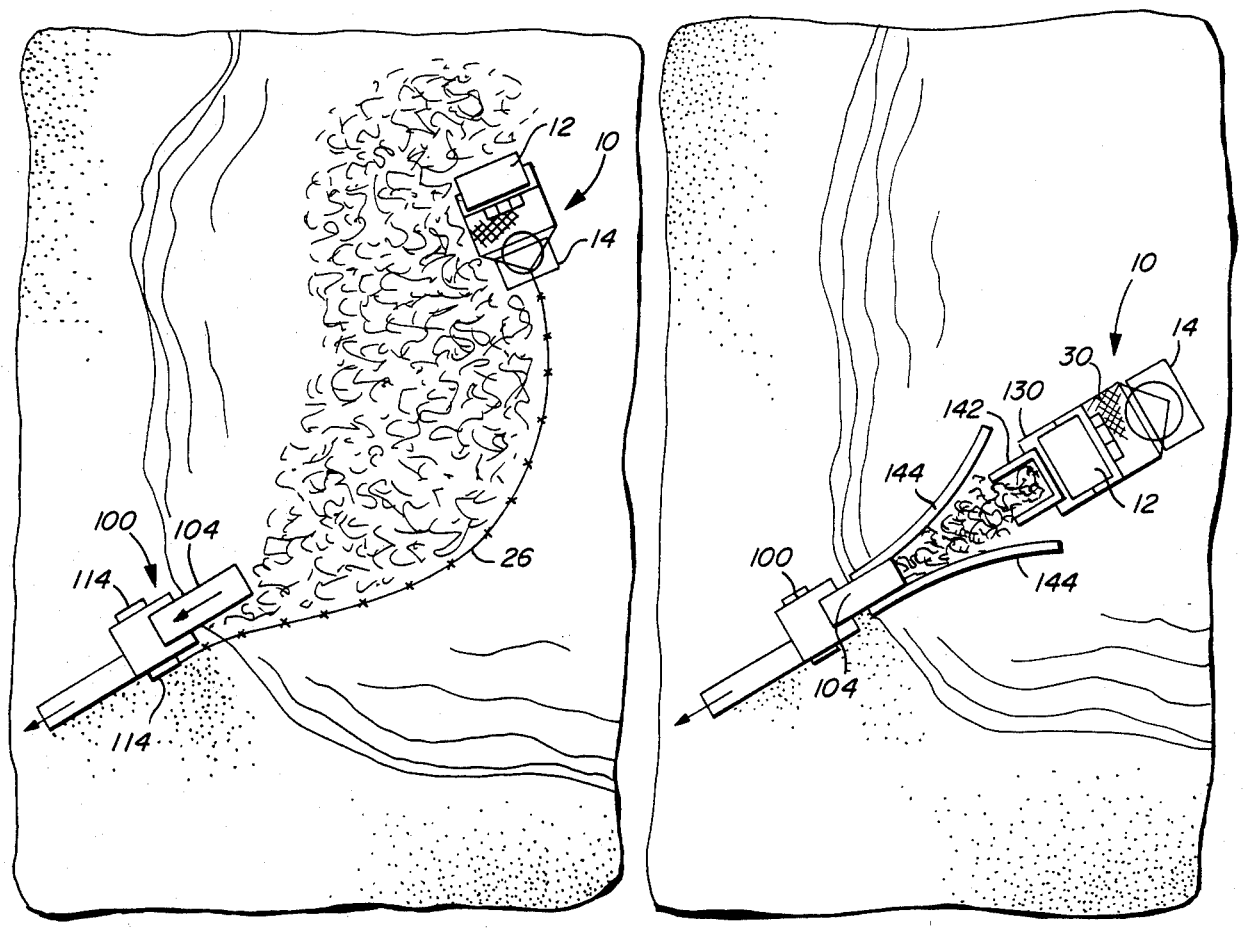

METHOD AND SYSTEM FOR CONDITIONING AND REMOVING AQUATIC PLANTS

BACKGROUND OF THE INVENTION

1. Field of the Invention

The present invention relates to systems and method for removing floating aquatic plants from large bodies of water.

2. Description of the Prior Art

The aquatic plant Eichhornia Crassipes Mart. Solmes, commonly referred to as "water hyacinth", is a vascular plant which grows on the surface of water with root structures generally extending only a few inches below the surface. This plant grows in densities ranging between 40 and 150 wet tons per acre, in fresh water bodies ranging from small canals and lakes to very large lakes and rivers. Water hyacinths can cause considerable ecological and economic harm in certain areas of the United States, particularly in the warmer regions, such as Florida and other Southeastern states.

Numerous systems and methods have been developed in the prior art for harvesting aquatic plants. Examples of such arrangements are disclosed in the following U.S. Pat. Nos.: 3,886,396 to Myer; 3,884,018 to Chaplin; 2,648,940 to Merkley, et al; 3,130,531 to Woleslagle; 2,677,926 to Washbourne, et al; 3,599,354 to Larson; 644,885 to Allen; 3,601,959 to Akermanis; and 3,971,148 to Deal.

Other prior art relating to the harvesting of aquatic plants also includes means for the handling of the plants after removal; see for example the following U.S. Pat. Nos.: 2,732,959 to De Penning; 4,258,534 to Bryant; 2,181,863 to Bell; 4,328,658 to Desrosiers, et al; 2,693,161 to Stubbs; 3,347,029 to Grinwald; 3,653,192 to Bryant; 4,240,243 to Deal; 4,248,033 to Bryant; and 4,222,217 to Brown.

There is additional prior art unrelated to techniques for removing aquatic plants which disclose various water craft drive mechanisms and propelling means; see the following U.S. Pat. Nos.: 3,680,522 to Clark, et al; 3,249,084 to Plants; and 1,911,827 to Knaus.

SUMMARY OF THE INVENTION

The present invention contemplates both a system and method for conditioning and removing aquatic plants, and particularly water hyacinth, growing on the surface of a body of water.

The method of the present invention includes the provision of a water craft having a rotatable drum, the specific density of which is substantially less than one, whereby the drum floats on top of the water. The drum is fitted with conditioning ribs extending away from the surface thereof, and the craft is moved across an area of compacted growth of surface aquatic plants or across open water. The drum is rotated so that the ribs separate and condition the growth of plants for a relatively uniform distribution across the surface, making the movement of the plants into the influence of a conveyor or similar removal mechanism substantially less difficult. After the step of conditioning and separating the plants, the plants may then be removed and collected. In accordance with the present invention, the method for collecting the plants contemplates the use of means associated with the craft; in one example, the distribution of a buoyant, flexible length of material about the conditioned growth of plants, and the reeling in of the flexible length via a take-up reel positioned adjacent a shore-located conveyor so that the aquatic plants are drawn into the conveyor and removed from the body of water may be used. In a second example, the craft has a fork which may be used to push the floating mass of plants into the conveyor. Preferably, the aquatic plants are chopped as an output from the conveyor.

The system utilizing and incorporating the method described above includes a prime mover for simultaneously rotating the drum and moving the craft. In a preferred embodiment, the craft includes two drums, both of which have a specific density substantially less than one and conditioning ribs extending away from the outer peripheral surface of each drum. Frame means are provided interconnecting the two drums, the prime moving means permitting rotation of each drum independent of each other.

In the preferred embodiment, the system includes a steering mechanism comprising a frame supported above the water by both of the drums, with the prime mover carried by the frame. A plurality of support rollers are carried by the frame and rotatably engage a steering support ring. The steering support ring is fixed to a steering drum frame, which in turn is supported by one of the drums. A hydraulic cylinder is coupled between the frame and the steering drum frame, such that actuation of the cylinder causes rotation of the steering support ring about the supporting rollers thereby changing the angle of direction of the corresponding drum with respect to the frame.

DESCRIPTION OF THE DRAWINGS

FIGS. 3(a), 3(b) and 3(c) are top plan front and side views, respectively, of portions of the craft shown in FIG. 1.

FIG. 4 is a side view of the take-up reel and conveyor system of the present invention.

FIG. 5 is a rear elevation of the take-up reel and conveyor system of the present invention.

FIG. 6 pictorially illustrates the method of the present invention, utilizing the take-up reel embodiment of FIGS. 4 and 5.

FIGS. 7 and 8 are perspective and pictorial views of a second embodiment of the means for collecting the floating mass of aquatic plants.

DESCRIPTION OF THE PREFERRED EMBODIMENT

An aquatic plant-conditioning water craft in accordance with the present invention will now be described with reference to FIGS. 1, 2 and 3(a)-3(c).

Figure 1:
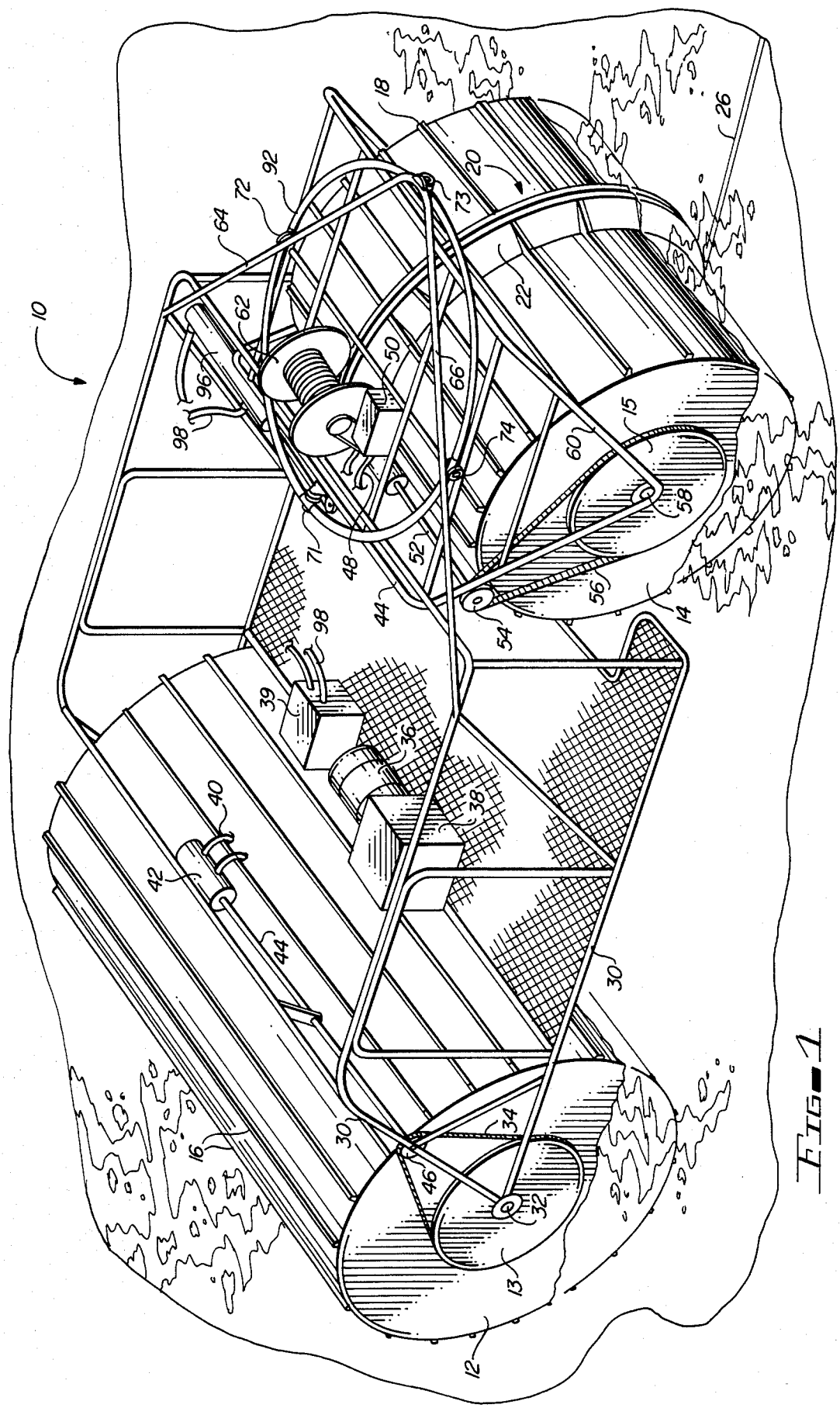
FIG. 1 is a side perspective view of an aquatic plant-conditioning water craft in accordance with the present invention.
Figure 2:
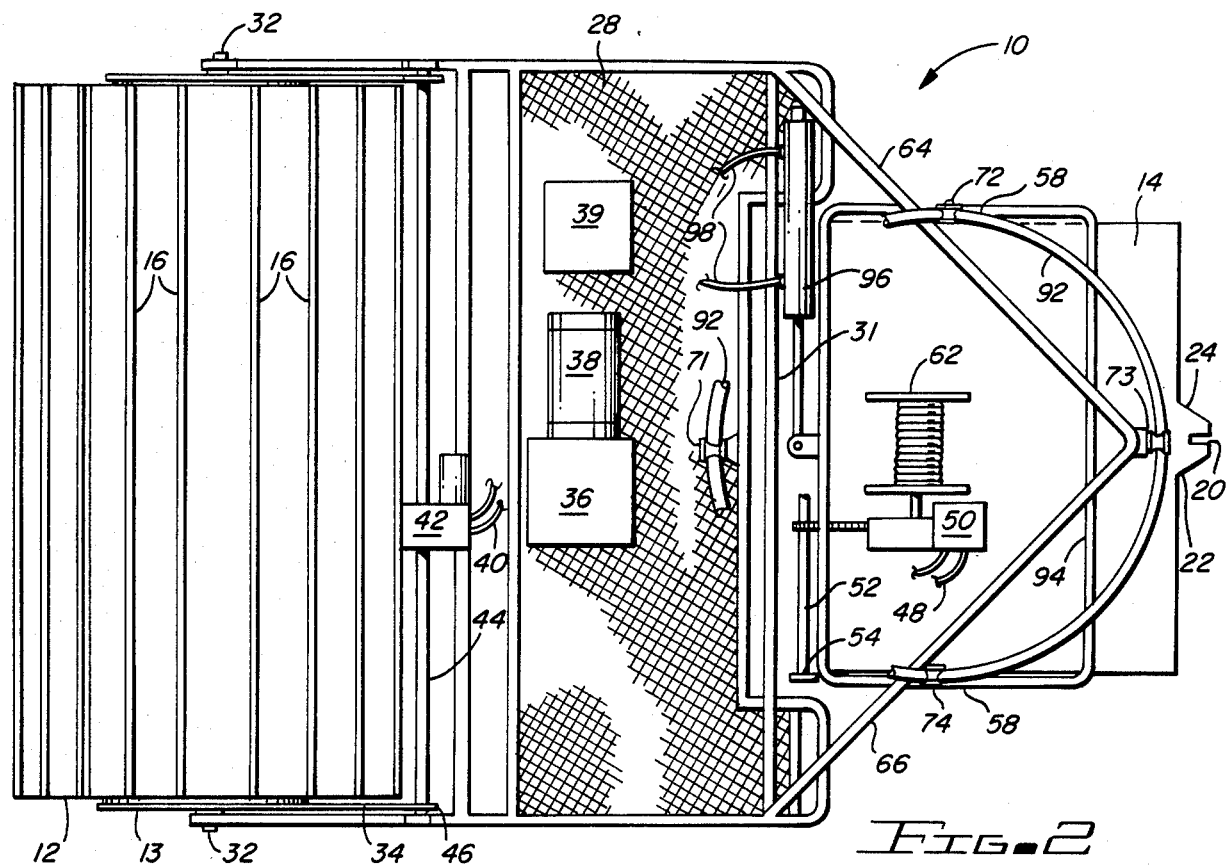
FIG. 2 is a top plan view of the water craft shown in FIG. 1.

Noting FIGS. 1 and 2, the craft, referred to generally be the reference numeral 10, includes a pair of drums 12, 14. Each drum has an associated drive pulley 13, 15 alongside for rotation of the respective drum. As is shown in FIG. 2, the drum 14 is substantially narrower than the drum 12. Each drum is fabricated from a sheet material, such as aluminum or plastic, and has sufficient volume therein to permit the overall drum to have a specific density substantially less than one. This permits each drum 12, 14 to float on top of a lake, river or other body of water which may be infested with surface aquatic plants therein with substantially all of the surface area of each drum above the surface of the water.

Each drum 12, 14 includes horizontal ribs 16, 18 extending away from the surface of the respective drum, 12, 14. The ribs 16, 18 permit the conditioning of the aquatic plants growing on the surface of the body of the water, as is described in greater detail below.

The drums 12, 14 together support a platform 28 via a frame. The frame includes a tubular frame member 30 supported by the first drum 12 via two bearings 32 on opposite sides of that drum, the bearings 32 permitting rotation of the drum by a direct drive belt or chain 34 encircling the pulley 13. As shown in FIG. 2, the tubular frame member 30 encircles and is joined to the platform 28. In addition to the frame member 30, the frame includes vertically extending struts 36 to provide rigidity.

A prime mover 36 (such as a small gasoline engine) is used to drive a hydraulic pump 38. The hydraulic pump 38, in turn, is used to rotate the first drum 12 via associated hydraulic circuitry 40, hydraulic converter 42, drive shaft 44, pulley 46 and belt 34. Similarly, the hydraulic pump 38 rotates the second drum 14 via hydraulic circuitry 48, hydraulic converter 50, drive shaft 52, sprocket 54 and belt 56. As is shown in FIG. 1, the belt 56 encircles the pulley 15 associated with the second drum 14. Bearings 58 on opposite sides of the second drum 14 permit rotation of that drum, and are fixed to a V-shaped steering frame 60.

The water craft 10 further includes a dispensing reel 62 supported by the frame member 30 above the second drum 14. The dispensing reel 62 includes the rope or cable 26 which is dispensed across the surface of the second drum 14.

It will be appreciated that each of the drums 12, 14 may be independently rotated at different speeds and in different directions, since each is operated by a separate and independent hydraulic drive system.

The steering mechanism of the water craft 10 will now be described with reference to FIGS. 1, 2 and 3(a)–(c).

Noting FIG. 2, the frame further includes struts 64, 66 extending forwardly of the frame member 30 and over the second drum 14, and a cross-member 31 between opposite sides of the tubular frame member 30. The steering mechanism includes four support rollers, which are identified by the reference numerals 71, 72, 73 and 74. As shown in FIG. 3(a), each of the support rollers 71–74 are fixed to either the struts 64, 66 or the cross member 31, with steering support ring 73 being fixed at the conjunction of the two struts 64, 66.

The details of each support roller 71–74 are the same; reference is made to support roller 71 for illustration purposes only in FIGS. 3(b) and 3(c).

Noting FIGS. 3(b) and 3(c), the support roller 71 includes a flat stock member 76 extending downwardly from the cross member 31, and having opposed upper and lower rollers 78, 80 rotatably supported thereon via corresponding bolts 82, 84. An axle support bar 86 is positioned between each bolt 82, 84 and the respective rollers 78, 80. As is shown in FIG. 3(c), each upper and lower roller 78, 80 includes a peripheral groove 88 defining a support ring aperture 90 between the two rollers.

Referring again to FIGS. 1, 2 and 3(a), there is provided a steering support ring 92 of generally circular cross section, an which is dimensioned to rotatably fit within the support ring aperture 90 of the respective support rollers 71–74. A portion of the steering support ring 92 is also shown in FIG. 3(b). A steering drum frame 94 is welded to the steering support ring 92; as is shown in FIG. 3(a), the steering drum frame 94 has a generally rectangular configuration, and thus the four points of intersection between that frame and the circular steering support ring 92 form four convenient locations for welding these two members together. The steering drum frame 94 is in turn fixed to the V-shaped steering frame 60, which is supported by the second drum 14 on the bearings 58.

With continued references to FIGS. 2 and 3(a), there is also provided an auxiliary hydraulic pump 39 located on the support platform 28. A hydraulic cylinder 96 is fixed to the strut 64 (note FIG. 3(a)), with the extremity of the piston of the hydraulic cylinder 96 fixed to the steering drum frame 94 at a point approximately midway between the two welds connecting the steering drum frame 94 to the steering support ring 92 along the side adjacent to the cross member 31. The hydraulic cylinder 96 is connected to the auxiliary hydraulic pump 39 via associated hydraulic circuitry 98 (note FIG. 2). It can be seen that movement of the piston of the hydraulic cylinder 96 will rotate the steering drum frame 94, to change the angular position of the second drum 14. The steering support ring 92 serves as a low-friction bearing platform for the overall steering mechanism.

The take-up reel and conveyor mechanism of the present invention will now be described with reference to FIGS. 4 and 5.

The take-up reel and conveyor mechanism is referred to generally by the reference numeral 100, and includes a prime mover 102 for driving the conveyor and take-up reel. The conveyor 104 is a conventional endless belt conveyor having a rotating drum 106 at the forward extremity thereof. The drum 106 has a series of cam-actuated fingers 108 which extend outwardly through the drum during rotation, but cam inside the drum to avoid contact with the conveyor along those portions of the drum immediately adjacent the extremity of the conveyor. The rear extremity of the conveyor 104 is positioned over a chopper 110, which chopper receives the conveyed aquatic plants as an input and chops the plants into a uniform size, which are then easily removed through a pump 112. Take-up reels 114 are positioned on opposite sides of the mechanism 100, in order to receive the rope 26 paid out from the reel 62 on board the water craft 10.

The manner of operation of the system of the present invention employing the take-up reel embodiment of FIGS. 4 and 5 will now be described with reference to FIG. 6. The craft 10 is moved through a body of aquatic plants, as in a lake, for example, and during that movement the surfaces of the drums 12, 14 and the associated ribs 16, 18 of the craft 10 condition the plants. Thereafter, the flexible length of rope or cable 26 is paid out from the reel 62 on the water craft 10, so as to encircle the body of aquatic plants, with the forward extremity of the rope or cable 26 attached to the take-up reel 114. After the rope 26 is paid out and the quantity of plants to be removed is encircled, then the other extremity of the rope 26 is attached to the opposite take up reel 114, and both reels are then operated to draw the rope 26 from both ends into the conveyor 104. In this way, a maximum amount of surface—growing aquatic plants may be removed with a minimum amount of expended energy, thus maximizing the efficiency of removal.

Another embodiment of the present invention will now be described with reference to FIGS. 7 and 8.

Figure 7:
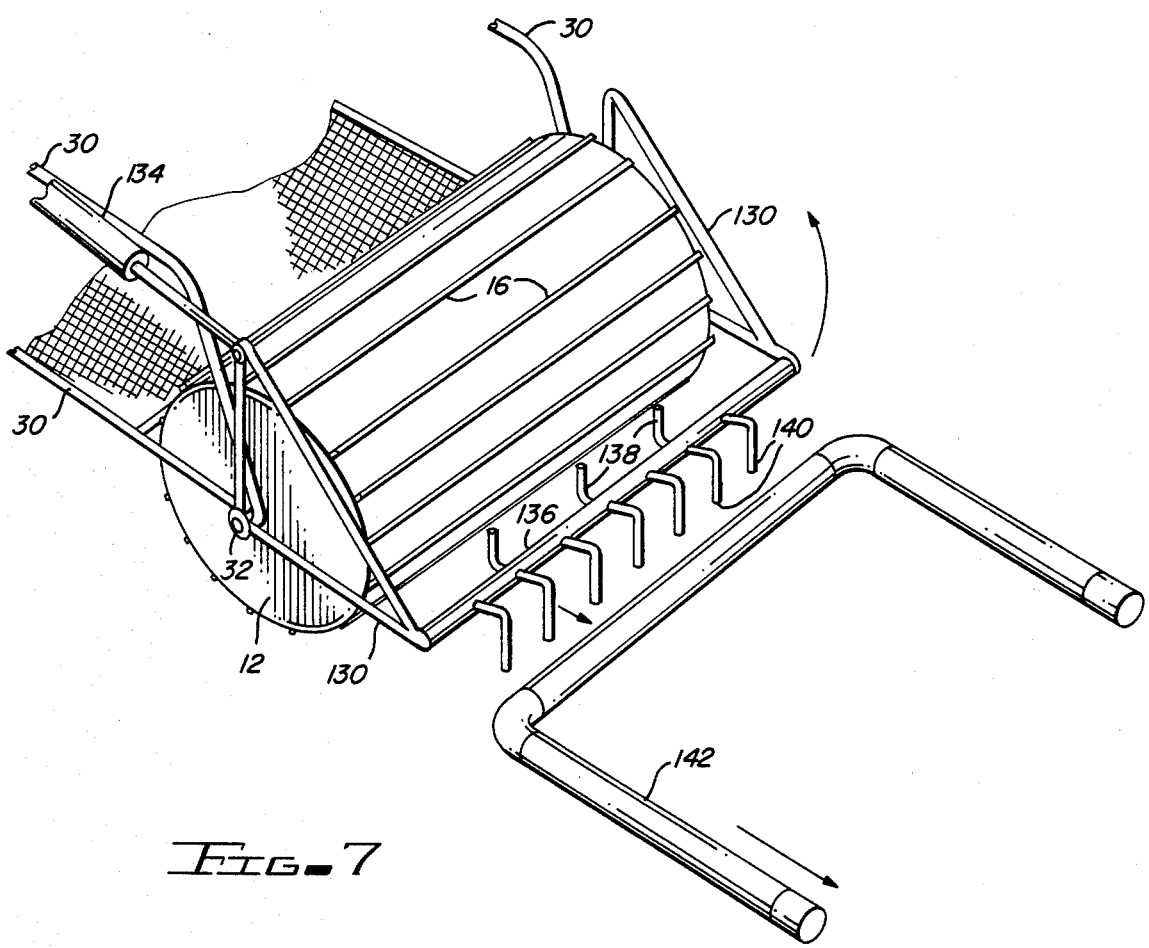

FIG. 7 illustrates a portio of the water craft 10 illustrated in FIG. 1, including the drum 12, associated ribs 16 and frame member 30. In accordance with this embodiment, the craft 10 is provided with a pushing mechanism pivotally attached to the shaft 32 of the drum 12. The pushing mechanism comprises a pushing frame 130, including a generally triangular construction (in this example) on either side of the drum 12, and a cross-member 136 extending between the opposing triangular constructions. The cross-member 136 has attached thereto a plurality of vertically extending teeth, some of the teeth 138 extending upwardly above the cross-member 136 and some of the teeth 140 extending downwardly from the cross member 136. A hydraulic cylinder 134 is attached to the upper portion of the frame member 30, with the extremity of the piston attached to one of the triangular constructions of the pushing frame 130.

The pushing assembly is also provided with a floating, relatively rigid pushing fork 142 which may comprise a generally U-shaped member formed of PVC tubing or the like.

Operation of the assembly of this second embodiment will now be described with reference to FIGS. 7 and 8.

Initially, the pushing mechanism may be utilized to compact portions of surface aquatic plants by lowering the pushing frame 130 and driving the water draft 10 in the direction of the plants to permit the lower vertical teeth 140 to push the plants in a forward direction. Thereafter, the pushing frame 130 may be lowered further in the direction of the water, to permit the upper teeth 138 to engage the pushing fork 142, which may be then used to push the compacted surface aquatic plants into a conveyor system such as that shown in FIG. 8.

In FIG. 8, the shore-bound conveyor system 100, earlier described in FIGS. 4 and 5, is provided with two outwardly extending booms 144. The water craft 10 is utilized with the associated pushing frame 130 and the pushing fork 142 to drive the compacted surface aquatic plants into the area of the booms 144, so as to permit the plants to be drawn into the conveyor 104 and the associated chopping mechanism 100.

We claim:

1. A method for conditioning aquatic plants growing on the surface of a body of water, said method comprising the steps of:
   (a) providing a water craft having a rotatable drum, the specific density of said drum being substantially less than 1, whereby said drum floats on top of a body of water;
   (b) fitting said drum with conditioning ribs extending away from the surface thereof;
   (c) moving said craft across an area of compacted growth of surface-growing aquatic plants;
   (d) rotating said drum so that said ribs separate and condition said growth of plants for a relatively uniform distribution across the surface of said body of water; and
   (e) removing said plants from said body of water after said separating and conditioning step.

2. The method recited in claim 1 wherein said moving step comprises rotating of said drum.

3. The method recited in claim 1 wherein said removing step comprises:
   (a) distributing a buoyant, flexible length of material from said craft about the conditioned growth of aquatic plants; and
   (b) reeling in said flexible length to draw the conditioned growth of aquatic plants to a removal site.

4. The method recited in claim 3 wherein said distribution step comprises paying out said length of said flexible material from said drum during rotation thereof.

5. The method recited in claim 1 further comprising the steps of:
   (a) providing a second drum having a specific density substantially less than 1;
   (b) fitting said second drum with conditioning ribs extending away from the surface thereof;
   (c) interconnecting said two drums with a frame; and
   (d) rotating said second drum during motivation of said craft for moving said second drum across the surface of said body of water and to further separate and condition said growth of plants for a relatively uniform floating distribution across the surface of said body of water.

6. The method recited in claim 5 further comprising the step of rotating each of said drums independently of the other, whereby said drums may be simultaneously rotated at different speeds and in different directions.

7. The method recited in claim 5 wherein the axis of rotation of said drums are both parallel with the aquatic plant-containing body of water.

8. The method recited in claim 3 wherein said removing step further comprises the steps of:
   (a) providing a conveyor at the shore edge of said body of water and having an associated take-up reel coupled with said length of said flexible material;
   (b) reeling said flexible material in on said take-up reel so as to draw said surface aquatic plants into said conveyor; and
   (c) conveying said surface aquatic plants out of said body of water.

9. The method recited in claim 8 further comprising the steps of:
   (a) chopping the aquatic plant output from said conveyor; and thereafter
   (b) pumping said chopped aquatic plants away from the shore edge of said body of water.

10. Apparatus for conditioning aquatic plants growing on the surface of a body of water, said apparatus comprising:
    (a) a water craft having first and second spaced rotatable drums, with the specific density of said drums being less than one, whereby said drums float on the top of said body of water;
    (b) conditioning ribs extending away from the outer peripheral surface of said drums;
    (c) frame means for interconnecting said two drums;
    (d) means for moving said craft across an area of compacted growth of surface-growing aquatic plants on said body of water;
    (e) means for rotating said drums so that said ribs separate and condition said growth of plants for a relatively uniform distribution across the surface of said body of water; and means for removing said separated and conditional aquatic plants from said body of water.

11. The apparatus recited in claim 10 wherein said ribs extend generally perpendicular to the outer peripheral surface of said drums.

12. The apparatus recited in claim 11 wherein said ribs of said drum are parallel.

13. The apparatus recited in claim 10 wherein said water vessel includes a prime mover for simultaneously rotating said drum and moving said craft.

14. The apparatus recited in claim 10 wherein said removing means comprises:
   (a) a buoyant flexible length of material, such as rope or cable; and
   (b) means including a pay-out reel on said craft for distributing said buoyant flexible length during rotation of said drum.

15. The apparatus recited in claim 14 wherein said distribution means includes said drum having means for paying out said buoyant flexible length along the surface of said body of water.

16. The apparatus recited in claim 10 further comprising means for rotating each of said drums independent of the other, whereby said drums may be simultaneously rotated at different speeds and in different directions.

17. The apparatus recited in claim 16 wherein the axis of rotation of said drums is parallel with said body of water.

18. The apparatus recited in claim 10 wherein said removing means further comprises:
   (a) a conveyor at the shore edge of said body of water;
   (b) a take-up reel with said conveyor and coupled to said buoyant flexible length;
   (c) means for reeling said buoyant flexible member onto said take-up reel to draw said surface aquatic plants into said conveyor; and wherein
   (d) said aquatic plants are conveyed out of said body of water.

19. The apparatus recited in claim 10 further comprising said water craft including a mechanism for steering said drum, said steering mechanism comprising:
   (a) a horizontally-disposed steering ring rotatably supported above said drum;
   (b) means fixing said drum with said ring; and
   (c) means for rotating said ring.

20. The apparatus recited in claim 19 wherein said rotating means comprises a hydraulic actuator coupled to said ring.

21. The apparatus recited in claim 10 further comprising a fork for pushing a quantity of said aquatic plants.

22. The apparatus recited in claim 21 wherein said fork comprises:
   (a) a U-shaped floating member;
   (b) a pushing assembly movably mounted forward of said first drum;
   (c) means for raising and lowering said pushing assembly; and
   (d) teeth on said pushing assembly for engaging said U-shaped floating member.

23. A low energy method for removing aquatic plants from a body of water, said method comprising the steps of:
   (a) providing a water craft having a rotatable drum, the specific density of said drum being substantially less than 1, whereby said drum floats on top of a body of water;
   (b) conditioning said plants with said water craft to spread and separate the aquatic plants growing on the surface of said body of water;
   (c) encircling a portion of said conditioned aquatic plants with a flexible member across the surface of said body of water; and
   (d) maneuvering said member to draw a quantity of said conditioned aquatic plants into onshore removal means.

* * * * *